UNITED STATES PATENT OFFICE.

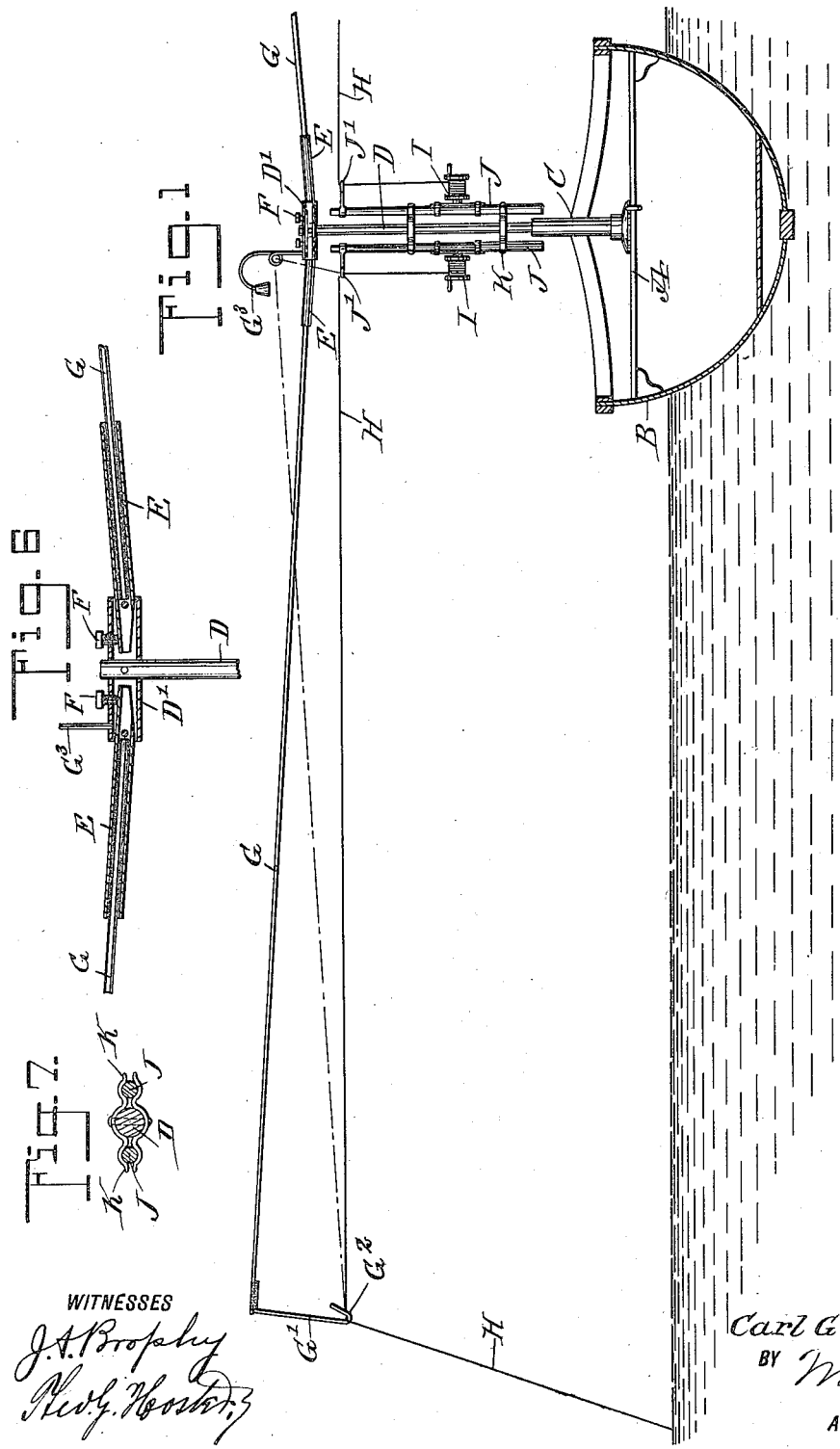

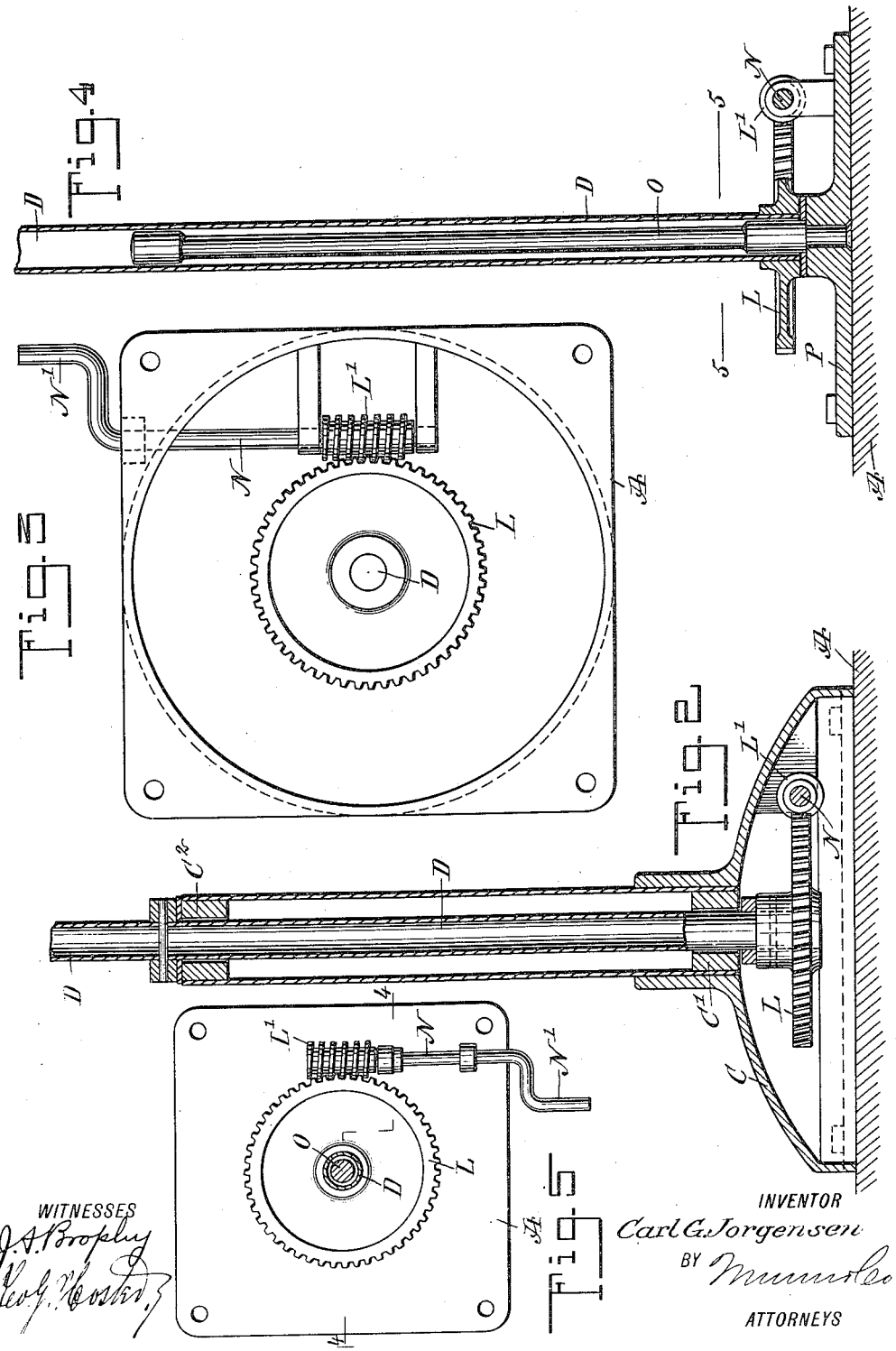

CARL GUSTAV JORGENSEN, OF CHICAGO, ILLINOIS.

FISHING APPARATUS.

952,812.

Specification of Letters Patent. Patented Mar. 22, 1910.

Application filed March 19, 1909. Serial No. 484,412.

*To all whom it may concern:*

Be it known that I, CARL GUSTAV JORGENSEN, a citizen of the United States, and a resident of Chicago, in the county of Cook and State of Illinois, have invented a new and Improved Fishing Apparatus, of which the following is a full, clear, and exact description.

The invention relates to fishing and trapping, and its object is to provide a new and improved fishing apparatus for use in rowboats, rafts, power boats and the like, and arranged to provide a means for suspending one or more fishing lines in the water at a safe striking distance from the boat and without unduly obstructing the interior of boat.

For the purpose mentioned, use is made of a post erected in the boat and provided at its upper end with lateral fishing rods or poles carrying fishing lines.

A practical embodiment of the invention is represented in the accompanying drawings, forming a part of this specification, in which similar characters of reference indicate corresponding parts in all the views.

Figure 1 is a side elevation of the improvement as applied to a boat, the latter being shown in cross section; Fig. 2 is an enlarged sectional side elevation of the mechanism for revolving the post; Fig. 3 is an inverted plan view of the same; Fig. 4 is an enlarged sectional side elevation of a modified form of the mechanism for revolving the post; Fig. 5 is a sectional plan view of the same on the line 5—5 of Fig. 4; Fig. 6 is an enlarged sectional side elevation of the adjustable sockets for carrying the fishing rods or poles; and Fig. 7 is a view of the spring catches for supporting the sticks carrying the reels.

On a board A or other support arranged within the boat B, is secured a stand C, provided with bearings C', C² (see Fig. 2), in which is mounted to turn a vertically-disposed post D provided at its upper end with a tubular cross arm D', in which are adjustably held the sockets E by means of set screws F screwing in the cross arm D' and abutting against the tapering ends of the sockets E, so as to support the sockets in a lateral position and to allow of slightly increasing or decreasing the inclination of said sockets E. Into the sockets E are set the butt ends of fishing rods or poles G of suitable length, and each provided at its outer end with a depending arm G' having a hook G² at its lower end for the passage of a fishing line H, so as to drop the outer end of the fishing line into the water a safe striking distance from the boat B. The fishing line H extends from the hook G² inward, to wind on a reel I attached to a short stick J removably supported in spring catches K attached to the post D. The stick J is preferably provided with an eye J' for guiding the fishing line H to the reel I.

In order to revolve the post D by the fisherman in the boat the following arrangement is made: On the lower end of the post D is secured a worm wheel L in mesh with the worm L' secured on a worm shaft N journaled in suitable bearings in the base of the stand C, and provided at one outer end with a handle N' under the control of the fisherman, to enable the latter to turn the shaft N so that the worm L' and the worm wheel L slightly rotate the post D. When this takes place, the fishing rods or poles G are carried around with the revolving post D, whereby the fishing lines H are dragged along, thus causing the fishing lines to troll in the water with the hooks a safe striking distance from the boat B. Now in case a fish is hooked, the fisherman stops rotating the post D and takes hold of a corresponding stick J and removes the same from the catches K, and then manipulates the reel I in the usual manner to draw in the line, the latter having previously been disengaged by the operator slightly turning the fishing pole G in the socket E, so that the hook G² swings out from under the fishing line H. When it is desired to do still fishing it is not necessary to rotate the post D.

Other suitable means may be employed for directing the fishing line H from the hook G² to the boat, and the fishing line may be connected with suitable alarm devices G³ for indicating that a fish has been hooked on the line.

In the modified form shown in Figs. 4 and 5, the post D is mounted to revolve on a stud O fixed in the base P secured to the support A in the boat, and on the said post D is mounted the worm wheel L engaging the worm L' secured on the crank shaft N under the control of the operator. In order to insure the desired lightness and to allow the use of the pin O, the post D is made hollow, as indicated in Figs. 2 and 4.

Having thus described my invention, I claim as new and desire to secure by Letters Patent:

1. A fishing apparatus for boats and the like, comprising a post mounted to revolve in the boat and provided with lateral sockets, fishing rods held in the said sockets, and means for revolving the post.

2. A fishing apparatus for boats and the like, comprising a post mounted to turn in the boat, means for rotating the post, laterally-extending fishing rods mounted on the upper end of the said post, and fishing lines carried by the said fishing rods and dropping from the outer end of the fishing rods into the water a distance from the boat, the fishing lines also extending into the boat to be within reach of the fisherman in the boat.

3. A fishing apparatus for boats and the like, comprising a post mounted to turn in the boat, means for rotating the post, laterally-extending fishing rods mounted on the upper end of the said post, fishing lines carried by the said fishing rods and dropping from the outer end of the fishing rods into the water a distance from the boat, and reels removably supported on the said post and on which wind the said fishing lines.

4. A fishing apparatus for boats and the like, comprising a post mounted to turn in the boat, means for rotating the post, laterally-extending fishing rods mounted on the upper end of the said posts, fishing lines carried by the said fishing rods and dropping from the outer end of the fishing rods into the water a distance from the boat, clamps on the said post, sticks removably engaged by the said clamps, and reels mounted on the said sticks and on which wind the said fishing lines.

5. A fishing apparatus for boats and the like, comprising a post erected in the boat, lateral sockets on the said post, fishing rods mounted to be turned in the said sockets and provided at their outer ends with depending arms having hook terminals, and fishing lines running through the said hook terminals to drop with their outer ends into the water, the inner ends of the fishing lines extending into the boat.

6. A fishing apparatus for boats and the like, comprising a post erected in the boat, lateral sockets on the said post, fishing rods mounted to be turned in the said sockets and provided at their outer ends with depending arms having hook terminals, fishing lines running through the said hook terminals to drop with their outer ends into the water, the inner ends of the fishing lines extending into the boat, and retaining means in the boat for the inner ends of the said fishing lines.

7. In a fishing apparatus, a post, a fishing rod held on the upper end of the post, a fishing line supported at the outer end of the fishing rod, clamps on the said post, a reel for the inner end of the fishing line, a support for the reel, removably engaged by the said clamps, and means on the support for guiding the line to the reel.

8. In a fishing apparatus for boats and the like, a post erected in the boat, a lateral socket at the upper end of the post, a fishing rod mounted in the said socket, a fishing line carried by the rod and dropping from the outer end thereof, spring clamps on the said post, a reel for the fishing line, and a support for the reel removably engaged by the said clamps.

9. In a fishing apparatus for boats and the like, a post mounted to turn in the boat, a laterally extending fishing rod mounted at the upper end of the post and carrying a fishing line, and means for turning the post comprising a worm wheel on the lower end of the post, and a manually controlled worm shaft provided with a worm in mesh with said worm wheel.

10. In a fishing apparatus, a post, a laterally extending fishing rod held on the upper end of the post, a fishing line carried by the fishing rod, a reel on which winds said fishing line, a vertical support for the reel provided with an eye at its upper end for guiding the line to the reel, and spring clamps for removably securing said support to the post.

In testimony whereof I have signed my name to this specification in the presence of two subscribing witnesses.

CARL GUSTAV JORGENSEN.

Witnesses:
L. G. HOOVER,
T. C. WENDELL.